United States Patent [19]

Hehn et al.

[11] Patent Number: 4,871,064
[45] Date of Patent: Oct. 3, 1989

[54] CASSETTE STORAGE CONTAINER

[75] Inventors: Bruce A. Hehn; James T. Weisburn, both of Massillon; Richard R. Lewellen; Mark W. Geis, both of Wooster, all of Ohio

[73] Assignee: Alpha Enterprises, Inc., North Canton, Ohio

[21] Appl. No.: 220,682

[22] Filed: Jul. 18, 1988

[51] Int. Cl.⁴ .......................................... B65D 85/672
[52] U.S. Cl. .................................... 206/387; 206/472; 206/493; 242/75.4
[58] Field of Search ....................... 206/387, 493, 472; 242/75.4

[56] References Cited

U.S. PATENT DOCUMENTS

| | | | |
|---|---|---|---|
| 1,712,473 | 5/1929 | McWethy | 206/493 X |
| 3,876,071 | 4/1975 | Neal et al. | 206/387 |
| 3,896,929 | 7/1975 | Mills | 206/493 X |
| 3,998,324 | 12/1976 | Roccaforte | 206/493 X |
| 4,011,940 | 3/1977 | Neal et al. | 206/1.5 |
| 4,054,206 | 10/1977 | Kobayashi et al. | 206/387 |
| 4,078,657 | 3/1978 | Schurman | 206/387 |
| 4,196,806 | 4/1980 | Posso | 206/387 |
| 4,231,474 | 11/1980 | Takahashi | 206/387 |
| 4,245,740 | 1/1981 | Thiele | 206/387 |
| 4,428,482 | 1/1984 | Ogawa | 206/387 |
| 4,479,580 | 10/1984 | Shirako | 206/493 X |
| 4,593,814 | 6/1986 | Hagiwara et al. | 206/387 |
| 4,614,269 | 9/1986 | Dietze et al. | 206/387 |

*Primary Examiner*—Arnold Rosenthal
*Attorney, Agent, or Firm*—Michael Sand Co.

[57] ABSTRACT

A container for storing a tape cassette of the type having a pair of spaced tape reel hubs. Each hub has a bottom wall and a cylindrical sidewall which define a recess in the hub. The storage container includes enclosure means for receiving and enclosing a cassette in the container. Toggle pairs are mounted on a bottom wall of the storage container and project into the hub recesses through an aligned access opening formed in a bottom wall of the tape cassette upon placing the cassette into the container. The toggle pairs are engaged by the bottom wall of the tape reel hub upon placement of a cassette into the storage container and move outwardly toward an expanded position and into engagement with the cylindrical sidewall of the reel hubs to prevent rotation of the hubs and resultant unwinding of and possible damage to the tape contained thereon. Pairs of inner and outer concentric annular members are formed integrally with the bottom wall of the storage container and encircle the toggle pairs and are located to project through the access openings of the cassette. The outer annular member engages the bottom wall of the cassette to limit lateral movement of the cassette and the inner member enters the hub recess and engages the toggles to prevent the toggles from moving beyond their expanded position.

22 Claims, 1 Drawing Sheet

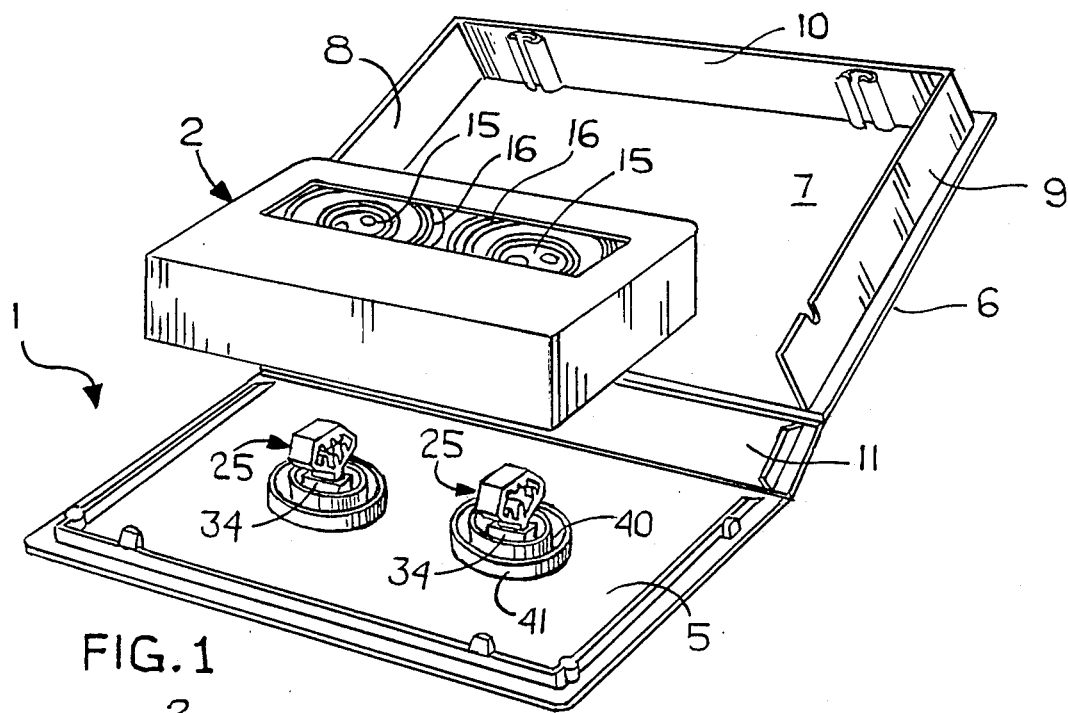
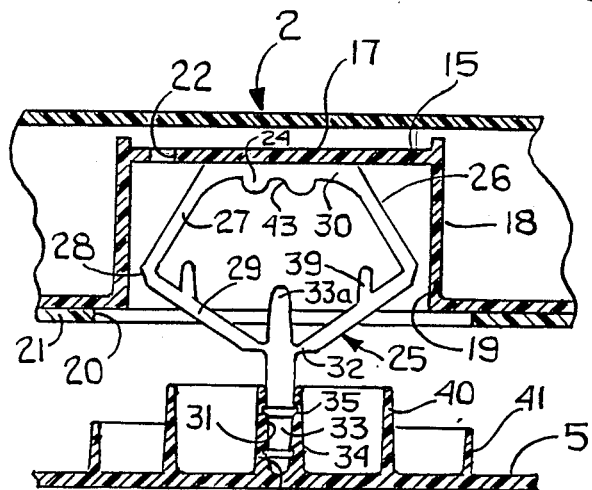
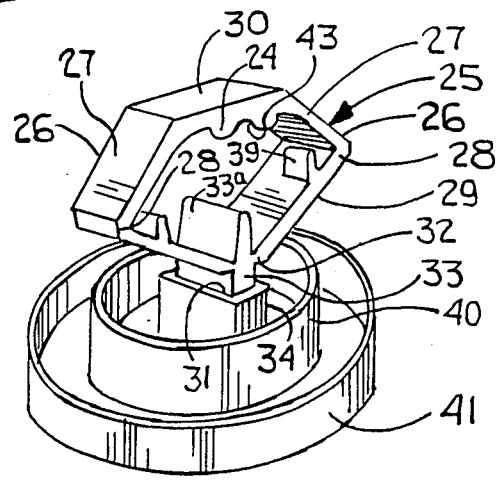
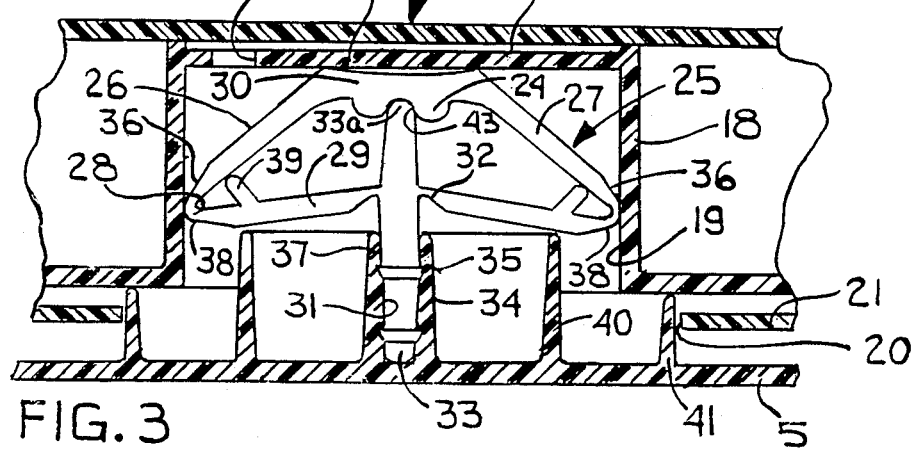
FIG. 1
FIG. 2
FIG. 3
FIG. 4

CASSETTE STORAGE CONTAINER

TECHNICAL FIELD

The invention relates to containers, and in particular to containers for storing video cassettes. More particularly, the invention relates to storage container which is adapted to receive and enclose a video cassette and which prevents rotation of the tape reel hubs housed within the cassette.

BACKGROUND ART

The use of video cassettes together with associated equipment such as video cassette recorders is growing in popularity. One type of cassette is used primarily by individuals to record programs directly from a television for replay at a later time, or alternatively is rented or purchased with a program or movie already prerecorded thereon. Another type of video cassette is used primarily for commercial purposes, and houses a magnetic tape having a three-quarter inch width format, which is wider than the half-inch tape format present in cassettes of the type used by individuals. It is desirable that these cassettes be shipped and stored in protective boxes or containers to prevent physical damage to the cassette during shipment, as well as to keep the cassette relatively dust-free during storage. It also is desirable that the tape reel hubs of these cassettes, and especially those of the larger tape format, be prevented from rotating during shipment caused by vibrations resulting from transport. Such rotation can cause the tape in the cassette to unwind from the hubs, often resulting in damage to the unwound portion of tape and loss of the information stored thereon.

Many of the cassette storage containers disclosed in the known prior art utilize one or more buttons or pins which engage drive holes formed in the tape reel hubs to prevent the hubs from rotating, as shown in U.S. Pat. Nos. 3,876,071; 4,011,940; 4,054,206; 4,078,657; and 4,231,474. Although such containers limit the rotation of the hubs, some rotation is necessary for moving the drive holes into alignment with the retention pins. Thus, damage to the small portion of the tape which unwinds from such rotation can still occur. U.S. Pat. No. 4,245,740 shows another cassette storage container in which a pin engages one of the drive holes in each of the tape reel hubs directly and immediately upon insertion of the cassette into the container.

U.S. Pat. No. 4,196,806 discloses a prior art cassette storage container in which ribs formed on a resilient arm engage teeth formed in the hub recess of a cassette to prevent rotation of the hub. U.S. Pat. No. 4,428,482 shows another prior art container having vertical fins attached to a projection which fit into grooves in the hub recess of a cassette. However, the containers shown in these prior art patents are not intended to prevent rotation of tape reel hubs which lack teeth or grooves.

Still other cassette containers disclosed in the prior art, such as U.S. Pat. Nos. 4,593,814 and 4,614,269, utilize friction elements which engage the internal surface of the hub recess of a cassette to prevent rotation of the hub.

There is no storage container for video cassettes of which we are aware, other than our invention set forth below, which is inexpensive, rugged, and which prevents rotation and rattling of the cassette tape reel hubs, including those lacking teeth or grooves, and which also limits lateral movement of the cassette within the container, by use of a toggle mechanism.

DISCLOSURE OF THE INVENTION

Objectives of the present invention include providing an improved cassette storage container which prevents rotation of the tape reel hubs of a cassette when the cassette is placed in the container for storage, so that unwinding of and possible damage to the tape contained within the cassette is avoided. Another objective of the present invention is to provide such an improved storage container which prevents rattling and other movement of the tape reel hubs within the cassette.

A further objective of the present invention is to provide such an improved storage container in which a pair of toggle devices are mounted in the storage container and properly position the cassette in the container and prevents lateral movement of the cassette therein, and which prevents rotation of the reel hubs immediately upon engagement with the hubs without requiring limited rotation of the hubs to provide alignment between pins and drive holes.

Still another objective of the present invention is to provide such an improved storage container which provides for lid-side storage of the tape cassette in the container and which securely grasps the cassette to prevent it from tumbling out of the storage container upon opening thereof, even if opened incorrectly.

A still further objective of the invention is to provide such an improved cassette storage container which can be mass-produced relatively inexpensively by plastic molding procedures, and which provides both a shipping and storage container for cassettes which prevents physical damage to the cassette during shipment, and storage in a relatively dust-free container.

A further objective is to provide such a storage container in which the hub engaging means is accomplished by a radially outwardly extending clamp-like motion which does not rely on a frictional engagement with the hub wall as in prior retention devices, and which is relatively unaffected by small variations in the diameter of the hub.

Another objective of the invention is to provide such an improved cassette storage container in which the toggle devices may be formed as a separate component and incorporated into existing container designs in a simple and efficient manufacturing procedure, eliminating the need of redesigning existing cassette containers used without such toggle devices for preventing rotation of the tape reel hubs.

These objectives and advantages are obtained by the improved cassette storage container of the invention, the general purpose of which is to store a tape cassette having at least one tape reel hub comprising a bottom wall and a cylindrical sidewall defining a recess in the hub, said hub recess being accessible through an opening formed in a bottom wall of the cassette, said storage container including enclosure means for receiving and enclosing a tape cassette in the storage container; and hub engaging means mounted in the storage container and located for entering the hub recess through the access opening when a cassette is placed in the storage container for preventing rotation of the tape reel hub, said hub engaging means including a pair of toggles movable between expanded and retracted positions, said toggles being engaged by the bottom wall of the tape reel hub upon placing a cassette into the storage container, so that the toggles move toward the expanded position and into engagement with the cylindrical sidewall to prevent rotation of the tape reel hub within the cassette.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is a perspective view of the improved storage container of the present invention in open position, and of a usual video tape cassette being inserted into the storage container;

FIG. 2 is an enlarged fragmentary sectional view of a tape reel hub of a cassette at the start of engagement with one of the toggle pairs of the storage container, with the toggle pair being shown in retracted position;

FIG. 3 is a further enlarged fragmentary sectional view similar to FIG. 2, showing the toggle pair in expanded position and in holding engagement with the cylindrical sidewall of the tape reel hub; and FIG. 4 is an enlarged fragmentary perspective view of one of the toggle pairs mounted within inner and outer annular concentric retaining members of the storage container.

Similar numerals refer to similar parts throughout the drawings.

BEST MODE FOR CARRYING OUT THE INVENTION

The improved cassette storage container of the present invention is indicated generally at 1, and is shown in FIG. 1 in an open position prior to receiving and enclosing therein a video tape cassette, indicated generally at 2. Storage container 1 has a rectangular box-shaped configuration which forms a hollow enclosure when closed, and preferably is formed of a molded plastic material, such as polypropylene. Container 1 includes a rectangular-shaped flat bottom wall 5, and a rectangular-shaped lid 6. Lid 6 includes a top closure wall 7 similar in size and shape to bottom wall 5, and upstanding parallel, end walls 8 and 9 and a front wall 10. Walls 8, 9 and 10 are formed integrally with top wall 7 and are arranged in a U-shaped configuration to enclose three sides of bottom wall 5 when in closed position. Lid 6 is movably mounted on bottom wall 5 by a double hinged panel 11 for pivotal movement between open and closed position.

Video cassette 2 (FIGS. 1-3) is of the type having a pair of spaced tape reel hubs 15 mounted within the cassette, which hubs have a magnetic tape 16 wound thereon. Each tape reel hub 15 includes a bottom wall 17, which is formed with usual drive holes 22 therein, and a cylindrical sidewall 18 which defines a recess 19 in the hub. A pair of spaced access openings 20 are formed in a bottom wall 21 of cassette 2, each of which is generally aligned with a respective one of the hub recesses 19.

In accordance with a main feature of the invention, a pair of toggle assemblies, each indicated generally at 25, are mounted in spaced relationship on bottom wall 5 of container 1, as shown in FIG. 1. Toggle assemblies 25 project outwardly from the inside surface of bottom wall 5 and are each located to project through cassette access openings 20 and into a respective one of the hub recesses 19 when cassette 2 is placed in container 1 (FIGS. 2 and 3). Since the construction and operation of each toggle assembly 25 is similar, only one of the assemblies will be described in detail herein.

Toggle assembly 25 is movable between a retracted position (FIG. 2) and an expanded position (FIG. 3). Each toggle assembly 25 includes a pair of generally V-shaped, outwardly facing toggles 26 as shown in FIG. 4. Each toggle 26 includes an upper arm 27 hingedly attached at an elbow joint 28 to a lower arm 29. Toggles 26 are connected by a cross member 30 which extends between and is formed integrally with the upper ends of upper arms 27. Toggles 26 and cross member 30 form a generally pentagonal-shaped configuration as shown in FIG. 2. A lower end of each lower arm 29 is attached by a hinge 32 to a base 33 which is oriented perpendicular to cross member 30.

Toggles 26 of assembly 25 preferably are formed of a resilient material such as polypropylene serving to normally bias the toggles toward the retracted position as shown in FIG. 2. Furthermore, a lug 39 may be formed integrally on lower arm 29 of each toggle 26 and located for engaging upper arm 27 when the toggle is in the expanded position for biasing the toggles toward the retracted position (FIG. 3).

Toggle assembly 25 preferably is mounted on bottom wall 5 of container 1 by insertion of its base 33 into a complementary shaped opening 31 formed in a generally rectangular-shaped, upwardly extending retaining member 34 which is formed integrally with bottom wall 5 (FIGS. 3 and 4). A plurality of barbs 35 are formed on base 33 and are embedded into interior walls 37 which define opening 31, to assist in securely maintaining base 33 in engagement within opening 31 of member 34. Base 33 preferably is inserted into opening 31 while member 34 is still in a partially heated and soft state, whereby upon cooling the toggle assembly is firmly secured in position within member 34. Upper end 33a of base 33 engages a channel 43 formed in cross member 30 (FIG. 3) by a pair of spaced nubs 24 formed integrally with cross member 30, for assisting in the insertion of the toggle assembly in member 34. More particularly, a certain amount of force must be applied to cross member 30 to insert the assembly in member 34. The engagement of base end 33a in channel 43 enables the force applied to the cross member to be transmitted directly to the base without a significant amount of the force being transmitted to the toggle arms.

A pair of inner and outer upstanding concentric annular members 40 and 41, respectively (FIGS. 1-4), are formed integrally with bottom wall 5 of container 1, and encircle each retaining member 34. Inner member 40 is of a considerably greater height than outer member 41. Annular members 40 and 41 are of the type presently used on many known cassette storage containers for generally holding and positioning the cassette within the container. Each pair of annular members 40 and 41 is located to project into a respective access opening 20 of cassette 2 when it is placed in the storage container, as will be described in greater detail below in connection with the discussion of the operation of toggle assembly 25.

Cassette 2 is placed into container 1 as shown in FIG. 1, whereby each access opening 20 is manually aligned with a respective one of the toggle assemblies. The cassette is moved toward bottom wall 5 until cross member 30 of each toggle assembly 25 passes through access opening 20 and into hub recess 19 and into engagement with bottom wall 17 of a respective one of the tape reel hubs, as shown in FIG. 2. Continued manual downward pressure on the cassette toward bottom wall 5, overcomes the normal bias exerted on the toggles by hinges 28 and 32 and the mechanical bias exerted thereon by lugs 39, moving the toggles into the expanded position shown in FIG. 3.

Each elbow joint 28 preferably has a pair of generally flat surface areas 36 and 38 on each side of joint 28 when the toggles are deformed in the expanded position, whereby flat surface 36 generally abuts cylindrical side wall 18 of the tape reel hub as shown in FIG. 3. This provides a gripping area against the hub to prevent rotation and rattling of the hubs within the cassette. The elbow joint engages the hub sidewall at a point which is at or just past the midpoint of the somewhat arcuate path that elbow joint 28 follows in moving from retracted to expanded position. In moving from the retracted to the expanded position the acute angle which is formed between the toggle arms decreases as shown in FIGS. 2 and 3.

Lower toggle arm 29 engages the top peripheral edge of inner annular member 40 upon reaching its generally full expanded position as shown in FIG. 3. Member 40 functions as a stop to prevent continued downward and inward movement of the toggle which would result in disengagement or loosening of the pressure contact between toggle joint surface 36 and sidewall 18 of the hub reel. Inner annular member 40 thus insures that the toggle is in the optimum grasping position with the tape reel hub upon being moved to the expanded position by engagement of cross member 30 with bottom hub wall 17. Additionally, the engagement of upper end 33a of base 33 in cross member channel 43 serves to stop any continued downward movement of cross member 30, which assists in maintaining the toggles in their optimum grasping position.

Each outer annular member 41 engages or extends into one of the access openings 20 formed in bottom wall 21 of the cassette and engages the circular edge of the bottom wall which defines access opening 20 as shown particularly in FIG. 3, to position and prevent lateral movement of the cassette within the container.

In accordance with another feature of the invention, each toggle assembly 25 may be molded independently of container 1 and inserted into opening 31 of retaining member 34 when forming the final cassette storage container. For certain applications, the toggle assembly may not be required and container 1 will be used without the incorporation of toggle assembly 25 therein. In this application outer annular ring 41 positions and prevents lateral movement of the cassette within the container. If desired, radially outwardly extending ribs (not shown) may be molded on the outer surface of inner annular member 40 to provide a frictional engagement with the cassette hubs to limit rotation thereof. However, such ribs do not provide sufficient engagement when used with the three-quarter inch tape format due to the additional weight and forces required to prevent rotation of the hubs.

Although the toggle assemblies mounted within improved storage container 1 are intended primarily for use with the commercial three-quarter inch tape format, such features and operation can be incorporated into the storage container used for the one-half inch tape format. Also, the toggle assemblies can be incorporated into containers for use in other areas than video tapes, such as audio tapes, movie film reels or other apparatus in which the prevention of rotation of a member having a hub recess opening is desired. Thus the invention need not be limited to video tapes.

In summary the improved cassette storage container is inexpensive to manufacture, rugged, easy to use, and effectively prevents rotation of the tape reel hubs of a cassette so that the magnetic tape contained therein remains wound on the hubs and undamaged during shipment and storage. The improved container also prevents rattling and other undesirable movement of the hubs, as well as lateral movement of the cassette within the container. The container additionally provides a dust-free environment for storage of the cassette and prevents physical damage to the cassette during shipment. Finally, the lid-side storage feature of the container prevents a cassette from tumbling out of the container upon opening of the container.

Accordingly, the improved cassette storage container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cassette storage container is constructed, and the advantageous, new and useful results obtained; the new and useful structures, devices, elements, arrangements, parts, and combinations, are set forth in the appended claims.

What is claimed is:

1. A container for storing a tape cassette having at least one tape reel hub comprising a bottom wall and a cylindrical sidewall defining a recess in the hub, said hub recess being accessible through an opening formed in a bottom wall of the cassette, said storage container including enclosure means for receiving and enclosing a tape cassette in the storage container; and hub engaging means mounted in the storage container and located for entering the hub recess through the access opening when a cassette is placed in said container for preventing rotation of the tape reel hub, said hub engaging means including a pair of toggles movable between expanded and retracted positions, said toggles being engaged by the bottom wall of said hub upon placing a cassette into the storage container, so that the toggles move toward the expanded position and into engagement with the cylindrical sidewall to prevent rotation of the tape reel hub within the cassette.

2. The device defined in claim 1 in which the enclosure means is a hollow container comprising spaced side, end, top and bottom walls.

3. The device defined in claim 1 in which each toggle comprises a pair of arms hingedly attached together at an elbow joint; in which each toggle is formed of a resilient material serving to normally bias the toggle toward the retracted position; and in which one arm of one toggle is joined to one arm of the other by a cross member and the other arms are hingedly connected to a base.

4. The device defined in claim 3 in which said toggles and cross member form a generally pentagonal shape when the toggles are in the retracted position.

5. The device defined in claim 3 in which each of the elbow joints includes a generally flat surface which engages the cylindrical sidewall of the hub reel when the toggle is in the expanded position.

6. The device defined in claim 3 in which each toggle is generally V-shaped; and in which the included angle between the arms of the toggle becomes increasingly acute as the toggle is moved from the retracted position toward the expanded position.

7. The device defined in claim 3 in which stop means is formed on the storage container and projects into the access opening and hub recess when a cassette is placed into the storage container for positioning the toggles in the expanded position and in engagement with the cylindrical sidewall.

8. The device defined in claim 7 in which positioning means is formed on the storage container and projects into the access opening when a cassette is placed into the storage container for positioning the cassette in the storage container.

9. The device defined in claim 8 in which the stop means and the positioning means are a pair of inner and outer concentric annular members, respectively, with said inner member having a greater vertical height than the outer member.

10. The device defined in claim 9 in which a retaining member is formed on the storage container within the pair of annular members; and in which the base of the toggle is embedded within the retaining member for mounting said toggle on the storage container.

11. The device defined in claim 10 in which the inner and outer annular members and the retaining member are formed integrally with a bottom wall of the storage container.

12. The device defined in claim 3 in which a lug is formed on a respective one of the arms of each toggle for engaging the other toggle arm when the toggle is in the expanded position, for biasing the toggle toward the retracted position.

13. The device defined in claim 3 in which a channel is formed on the cross member; and in which an upper end of the base extends into the channel when the toggles are in the expanded position for positioning the toggles in said expanded position.

14. A container for storing a tape cassette of the type having at least one tape reel hub provided with a sidewall defining a hub recess, said storage container including enclosure means for receiving and enclosing a tape cassette in the storage container; and an expandable pair of toggles mounted in the storage container and located for entering the hub recess, said toggles each comprising a pair of arms hingedly attached at an elbow joint and being formed of a resilient material serving to normally bias the toggle toward a retracted position, with one arm of each of the toggles being joined by a cross member and the other arms being hingedly connected to a base, so that the toggles prevent rotation of the hub by engaging the sidewall of the hub when a cassette is placed in the storage container.

15. The device defined in claim 14 in which the enclosure means is a hollow enclosure having spaced side, end, top and bottom walls.

16. The device defined in claim 14 in which each of the elbow joints includes a generally flat surface which engages the sidewall of the hub reel when the toggle is in the expanded position.

17. A container for storing a tape cassette of the type having at least one tape reel hub provided with a sidewall defining a hub recess, said storage container including enclosure means for receiving and enclosing a tape cassette in the storage container; expandable toggles mounted in the storage container and located for entering the hub recess; and stop means formed on the storage container and projecting into an access opening formed in a bottom wall of the cassette and the hub recess when a cassette is placed into the storage container, for positioning the toggles in the expanded position and in engagement with the sidewall of the hub to prevent rotation of the hub.

18. The device defined in claim 17 in which positioning means is formed in the storage container and projects into the access opening when a cassette is placed into the storage container for positioning the cassette in the storage container.

19. The device defined in claim 18 in which the stop means and the positioning means are a pair of inner and outer members, respectively, with said inner member having a greater vertical height than the outer member.

20. A device for preventing rotation of a reel hub of the type having a sidewall defining at least a portion of a hub recess, said device including a pair of toggles connected at one end by an upper cross member and supported at an opposite end by a base, said toggles each being formed by a pair of toggle arms joined by an elbow and further being movable between a retracted position and an expanded position and adapted to enter the reel hub recess, so that a force on the cross member applied toward the base expands the elbows outwardly for engagement with the hub sidewall for preventing rotation of the hub.

21. A container for storing a tape cassette having at least one tape reel hub comprising a bottom wall and a cylindrical sidewall defining a recess in the hub, said hub recess being accessible through an opening formed in a bottom wall of the cassette, said storage container including enclosure means for receiving and enclosing a tape cassette in the storage container; and hub engaging means mounted in the storage container and located for entering the hub recess through the access opening when a cassette is placed in said container for preventing rotation of the tape reel hub, said hub engaging means being initially of a size to fit with a clearance within the hub and expansible radially of the hub into contact therewith in response to movement of the cassette relative said enclosure means.

22. An improved container for storing a tape cassette of the type having at least one tape reel hub provided with a sidewall defining a hub recess, said storage container including enclosure means for receiving and enclosing a tape cassette in the storage container; wherein the improvement comprises expandable toggle means mounted in the storage container and located for entering the hub recess, said toggle means being formed of a resilient material serving to normally bias the toggle means toward a retracted position, so that when a cassette is placed in the storage container the toggle means moves to the expanded position and engages the sidewall of the hub for preventing rotation thereof.

* * * * *